United States Patent
Lin et al.

(10) Patent No.: US 9,627,982 B2
(45) Date of Patent: Apr. 18, 2017

(54) FLYBACK POWER CONVERTER AND CONTROL CIRCUIT THEREOF

(71) Applicants: Kun-Yu Lin, Zhubei (TW); Chien-Fu Tang, Hsinchu (TW); Hsin-Yi Wu, Taipei (TW); Kuang-Fu Chang, Kaohsiung (TW)

(72) Inventors: Kun-Yu Lin, Zhubei (TW); Chien-Fu Tang, Hsinchu (TW); Hsin-Yi Wu, Taipei (TW); Kuang-Fu Chang, Kaohsiung (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 58 days.

(21) Appl. No.: 14/697,438

(22) Filed: Apr. 27, 2015

(65) Prior Publication Data

US 2015/0326129 A1    Nov. 12, 2015

Related U.S. Application Data

(60) Provisional application No. 61/990,842, filed on May 9, 2014.

(51) Int. Cl.
*H02M 3/335* (2006.01)
*H02M 1/32* (2007.01)

(52) U.S. Cl.
CPC .. *H02M 3/33507* (2013.01); *H02M 2001/327* (2013.01)

(58) Field of Classification Search
CPC ............ H02M 3/335; H02M 3/33507; H02M 3/33523; H02M 2001/0003
See application file for complete search history.

(56) References Cited

U.S. PATENT DOCUMENTS

| | | | |
|---|---|---|---|
| 9,036,385 B2* | 5/2015 | Wu | ............... H02M 1/32 361/103 |
| 9,077,176 B2* | 7/2015 | Ke | ............... H02H 7/1213 |
| 2012/0106208 A1* | 5/2012 | Sugawara | ......... H02M 3/33523 363/21.13 |

* cited by examiner

*Primary Examiner* — Gary L Laxton
(74) *Attorney, Agent, or Firm* — Tung & Associates (57) ABSTRACT

A flyback power converter includes a transformer which has a primary winding, a secondary winding, and an auxiliary winding; a power switch controlling the conduction of the primary winding; and a control circuit generating a control signal to control the power switch, wherein the control circuit is an integrated circuit having a current sensing pin for obtaining a current sensing signal of a current through the power switch. The flyback power converter further includes a temperature-sensitive resistor or a mode detection resistor coupled between the auxiliary winding and the current sensing pin. The temperature-sensitive resistor provides a temperature-related signal for the control circuit to perform an over-temperature protection, or the temperature-sensitive resistor provides a mode detection signal for the control circuit to determine an operation mode of the flyback power converter.

21 Claims, 11 Drawing Sheets

FLYBACK POWER CONVERTER AND CONTROL CIRCUIT THEREOF

CROSS REFERENCE

The present invention claims priority to U.S. 61/990,842, filed on May 9, 2014.

BACKGROUND OF THE INVENTION

Field of Invention

The present invention relates to a flyback power converter and a control circuit thereof; particularly, the present invention relates to such a flyback power converter and a control circuit thereof, which can perform over-temperature protection (OTP) or detect whether the flyback power converter operates in a continuous conduction mode (CCM) or a discontinuous conduction mode (DCM) without requiring an additional pin.

Description of Related Art

Figure 1:
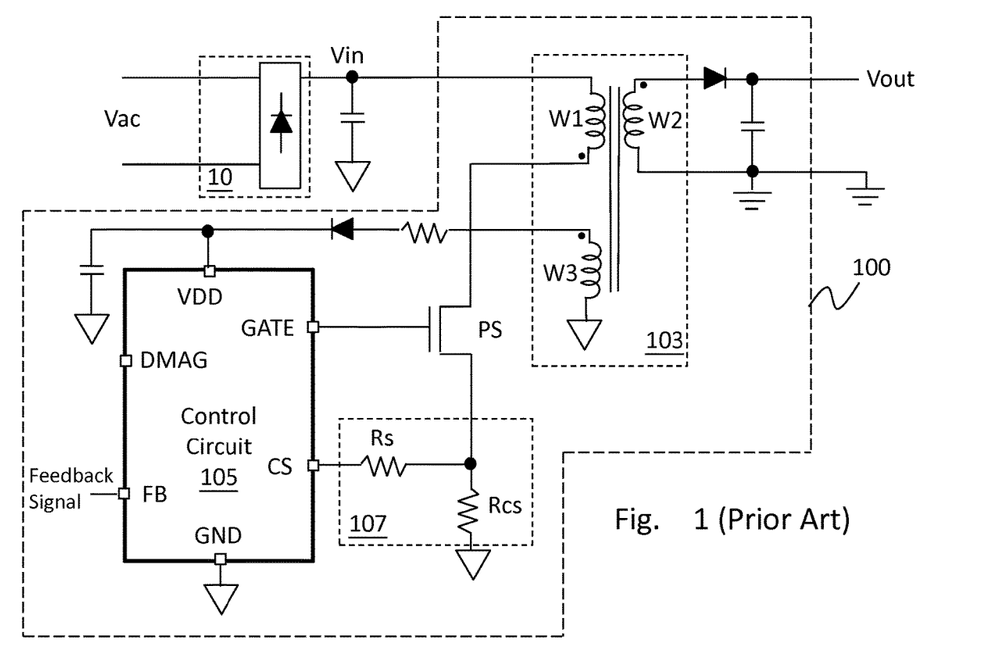
FIG. 1 shows a conventional flyback power converter.

FIG. 1 shows a conventional flyback power converter 100. An alternating current (AC) voltage Vac is rectified by a rectifier circuit 10 to generate an input voltage Vin. A primary winding W1 of a transformer 103 receives the input voltage Vin. A power switch PS controls the conduction time of the primary winding W1 to generate an output voltage Vout at the secondary winding W2. The power switch PS is controlled by a control circuit 105; the control circuit 105 is an integrated circuit which has a predetermined limited number of pins. To perform feedback control, the control circuit 105 needs to obtain current and voltage information. The current information is obtained through a current sense pin CS from a current sense circuit 107. The voltage information is obtained through a voltage feedback pin FB, from a voltage divider circuit (not shown) connected to an auxiliary winding W3 or from an opto-coupler (not shown) connected to the secondary side of the transformer 103. The control circuit 105 generates a control signal which is transmitted through a switch control pin GATE to control the operation of the power switch PS. In addition to the above pins, the control circuit 105 needs to be connected to a power source and ground, so it must have a power pin VDD and a ground pin GND (the power for example may come from the auxiliary winding W3). As such, there are five pins whose functions have already been predetermined.

In order to protect the flyback power converter 100 so that it will not be damaged by high temperature, the control circuit 105 needs to receive a signal which is temperature-related, so that the control circuit 105 can respond to temperature and shut down the power switch PS at a proper timing. In addition, in certain applications, it is required to detect whether the flyback power converter 100 operates in the CCM or the DCM. For such over-temperature protection (OTP) function and mode detection function, the control circuit 105 requires external information, that is, the control circuit 105 needs to communicate with an external circuit through its pin. Typically, the control circuit 105 is an integrated circuit having six pins. Hence, with five pins already used, there is one pin DMAG left. However, this pin DMAG is usually reserved for a function other than OTP or mode detection. Therefore, in prior art, either OTP and mode detection functions can not be achieved, or the control circuit 105 has to use a package with a higher number of pins, which is more costly.

In view of the above, the present invention proposes a flyback power converter and a control circuit thereof, which can perform OTP or mode detection without requiring an additional pin.

SUMMARY OF THE INVENTION

From one perspective, the present invention provides a flyback power converter, comprising: a transformer having a primary winding for receiving an input voltage, a secondary winding for generating an output voltage, and an auxiliary winding; a power switch coupled to the primary winding, for controlling an conduction time of the primary winding; a control circuit, for generating a control signal to control the power switch, the control circuit being an integrated circuit which has a current sense pin for receiving a current sense signal related to a current flowing through the power switch; and a temperature-sensitive resistor coupled between the auxiliary winding and the current sense pin, for providing a temperature-related signal to the control circuit, such that the control circuit determines whether to trigger an over-temperature protection (OTP) function according to the temperature-related signal.

In one embodiment, the control circuit generates the control signal according to the current sense signal and a voltage feedback signal related to the output voltage, and the control circuit determines whether to trigger the OTP function during a period wherein the power switch is OFF.

In one embodiment, the control circuit includes: a switch signal generation circuit, for receiving the current sense signal and the voltage feedback signal and generating the control signal; a comparator, for comparing the temperature-related signal and a reference signal to generate a comparison result indicating whether to trigger the OTP function; and an enable switch for enabling the comparator during the period wherein the power switch is OFF.

In one embodiment, the reference signal has a fixed voltage level or a variable voltage level which is correlated to the output voltage.

In one embodiment, the control circuit further includes a sampling pulse generation circuit for generating a sampling pulse during the period wherein the power switch is OFF, the sampling pulse controlling the enable switch to enable the comparator.

In one embodiment, the control circuit further includes a shielding circuit for disabling the comparator during an initial period in the period wherein the power switch is OFF.

In one embodiment, the flyback power converter further comprises a diode having an anode coupled to the auxiliary winding and a cathode coupled to the temperature-sensitive resistor.

In one embodiment, the flyback power converter further comprises a Zener diode having a cathode coupled to the auxiliary winding and anode coupled to the anode of the diode.

In one embodiment, the flyback power converter further comprises an adjustment resistor coupled between the temperature-sensitive resistor and the current sense pin.

From another perspective, the present invention provides a control circuit of a flyback power converter, the flyback power converter comprising a transformer having a primary winding for receiving an input voltage, a secondary winding for generating an output voltage, and an auxiliary winding; a power switch coupled to the primary winding, for controlling an conduction time of the primary winding according to a control signal generated by the control circuit; and a temperature-sensitive resistor having one end coupled to the auxiliary winding, the control circuit comprising: a current sense pin for receiving a current sense signal related to a current flowing through the power switch, and for coupling to another end of the temperature-sensitive resistor to obtain a temperature-related signal; a switch signal generation circuit, for receiving the current sense signal and a voltage feedback signal related to the output voltage and generating the control signal; a comparator, for comparing the temperature-related signal and a reference signal to generate a comparison result indicating whether to trigger an over-temperature protection (OTP) function; and an enable switch for enabling the comparator during a period wherein the power switch is OFF.

In one embodiment, the reference signal has a fixed voltage level or a variable voltage level which is correlated to the output voltage.

In one embodiment, the control circuit further comprises a sampling pulse generation circuit for generating a sampling pulse during the period wherein the power switch is OFF, the sampling pulse controlling the enable switch to enable the comparator.

In one embodiment, the control circuit further comprises a shielding circuit for disabling the comparator during an initial period in the period wherein the power switch is OFF.

From another perspective, the present invention provides a flyback power converter, comprising: a transformer having a primary winding for receiving an input voltage, a secondary winding for generating an output voltage, and an auxiliary winding; a power switch coupled to the primary winding, for controlling an conduction time of the primary winding; a control circuit, for generating a control signal to control the power switch, the control circuit being an integrated circuit which has a current sense pin for receiving a current sense signal related to a current flowing through the power switch; and a mode detection resistor coupled between the auxiliary winding and the current sense pin, for providing a mode detection signal to the control circuit whereby the control circuit performs a mode determination to determine whether the flyback power converter operates in a continuous conduction mode (CCM) or a discontinuous conduction mode (DCM).

In one embodiment, the control circuit generates the control signal according to the current sense signal and a voltage feedback signal related to the output voltage, and the control circuit determines whether the flyback power converter operates in the CCM or the DCM during a period wherein the power switch is OFF.

In one embodiment, the secondary winding is coupled to an output diode, and a result of the mode determination is used to determine whether there is a forward conduction voltage across the output diode, is used to control the flyback power converter to operate in a boundary conduction condition between the CCM and the DCM, or is used to perform a constant current control of a current flowing through the output diode.

In one embodiment, the control circuit includes: a switch signal generation circuit, for receiving the current sense signal and the voltage feedback signal and generating the control signal; a comparator, for comparing the mode detection signal and a reference signal to generate a comparison result for the mode determination; and an enable switch for enabling the comparator during the period wherein the power switch is OFF.

In one embodiment, the control circuit includes: a switch signal generation circuit, for receiving the current sense signal and the voltage feedback signal and generating the control signal; a zero-current crossing (ZCX) detection circuit, for detecting whether a ZCX condition occurs according to the mode detection signal; and an enable switch for enabling the ZCX detection circuit during the period wherein the power switch is OFF.

In one embodiment, the flyback power converter further comprises a diode having an anode coupled to the auxiliary winding and a cathode coupled to the mode detection resistor.

In one embodiment, the flyback power converter further comprises a Zener diode having a cathode coupled to the auxiliary winding and anode coupled to the anode of the diode.

From another perspective, the present invention provides a control circuit of a flyback power converter, the flyback power converter comprising a transformer having a primary winding for receiving an input voltage, a secondary winding for generating an output voltage, and an auxiliary winding; a power switch coupled to the primary winding, for controlling an conduction time of the primary winding according to a control signal generated by the control circuit; and a mode detection resistor having one end coupled to the auxiliary winding, the control circuit comprising: a current sense pin for receiving a current sense signal related to a current flowing through the power switch, and for coupling to another end of the mode detection resistor to obtain a mode detection signal; a switch signal generation circuit, for receiving the current sense signal and a voltage feedback signal related to the output voltage and generating the control signal; a comparator, for comparing the mode detection signal and a reference signal to generate a comparison result indicating whether the flyback power converter operates in a continuous conduction mode (CCM) or a discontinuous conduction mode (DCM), or a zero-current crossing (ZCX) detection circuit, for detecting whether a ZCX condition occurs according to the mode detection signal to generate a detection result indicating whether the flyback power converter operates in the CCM or the DCM; and an enable switch for enabling the comparator or the ZCX detection circuit during a period wherein the power switch is OFF.

The objectives, technical details, features, and effects of the present invention will be better understood with regard to the detailed description of the embodiments below.

DESCRIPTION OF THE PREFERRED EMBODIMENTS

Figure 2:
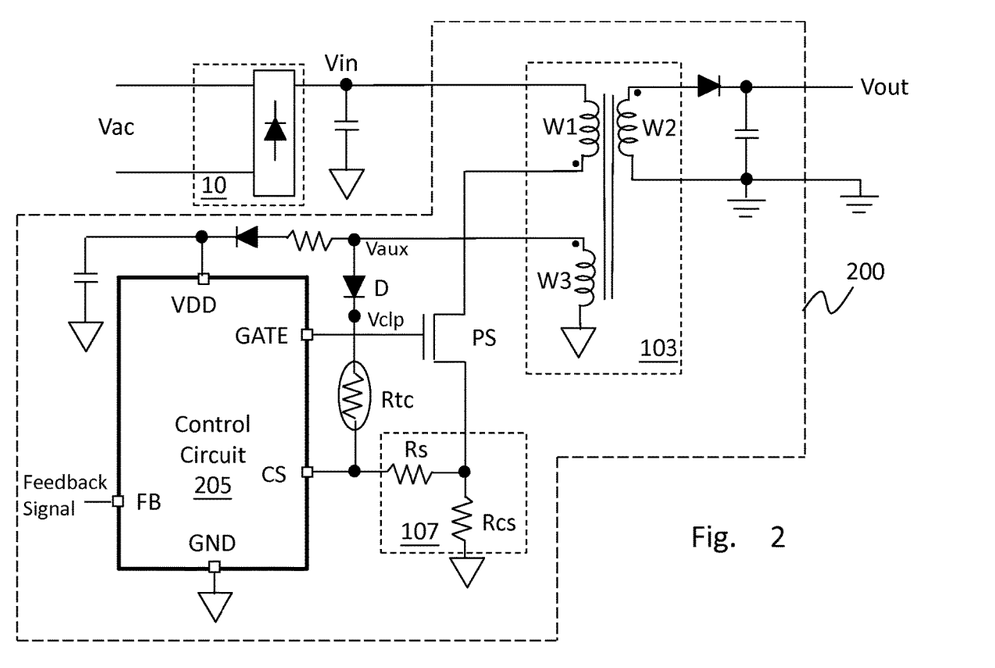
FIG. 2 shows a flyback power converter according to a first embodiment of the present invention.

Please refer to FIG. 2 for a flyback power converter according to a first embodiment of the present invention. As shown in FIG. 2, a rectifier circuit 10 rectifies an AC voltage Vac to generate an input voltage Vin. The rectifier circuit 10 is for example a bridge rectifier circuit. In the flyback power converter 200, a primary winding W1 of a transformer 103 receives the input voltage Vin. A power switch PS controls the conduction time of the primary winding W1 to generate an output voltage Vout at the secondary winding W2. The power switch PS is controlled by a control circuit 205; the control circuit 205 is an IC which has a predetermined number of pins. The control circuit 205 obtains a current sense signal through a current sense pin CS from a current sense circuit 107. The current sense signal is related to a current flowing through the power switch PS, which is the current flowing through the primary winding W1. The control circuit 205 obtains a voltage feedback signal related to the output voltage Vout through a voltage feedback pin FB. The voltage feedback signal can be generated from a voltage divider circuit (not shown) connected to an auxiliary winding W3 or from an opto-coupler (not shown) connected to the secondary side of the transformer 103. The current sense circuit 107 includes, for example but not limited to a resistor Rcs coupled between the power switch PS and ground, and a resistor Rs coupled between the power switch PS and the current sense pin CS. The resistor Rs is preferred but not necessary, and it can be omitted. The control circuit 205 generates a control signal which is outputted from the switch control pin GATE to control the operation of the power switch PS.

In this embodiment, the flyback power converter 200 further includes a temperature-sensitive resistor Rtc coupled between the auxiliary winding W3 and the current sense pin CS, for providing a temperature-related signal to the control circuit 205. The temperature-sensitive resistor Rtc can have a positive temperature coefficient (the resistance increases as the temperature increases) or a negative temperature coefficient (the resistance decreases as the temperature decreases). In addition, preferred but not necessary, a diode D can be coupled between the temperature-sensitive resistor Rtc and the auxiliary winding W3, wherein the anode of the diode D is coupled to the auxiliary winding W3 and the cathode of the diode D is coupled to the temperature-sensitive resistor Rtc. The diode D provides a voltage clamping function, but it can be omitted.

Figure 3:
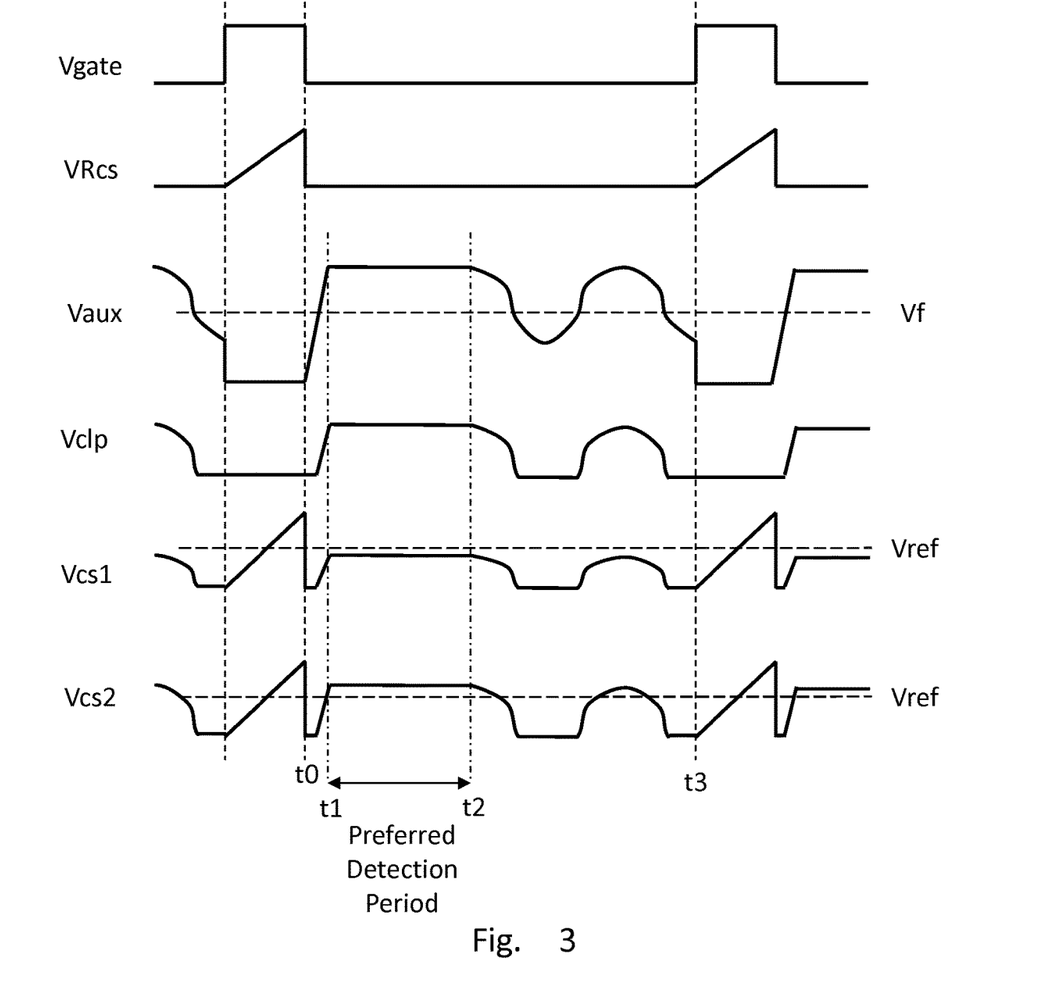
FIG. 3 shows waveforms of the control signal Vgate, the voltage VRcs across the resistor Rcs, the auxiliary winding voltage Vaux, the clamp voltage Vclp which is obtained by clamping the auxiliary winding voltage Vaux by a diode D, and the current sense pin voltages Vcs1 and Vcs2 under different conditions.

FIG. 3 shows waveforms of the control signal Vgate, the voltage VRcs across the resistor Rcs, the auxiliary winding voltage Vaux, the clamp voltage Vclp which is obtained by clamping the auxiliary winding voltage Vaux by the diode D, and the current sense pin voltages Vcs1 and Vcs2 under different conditions. Please refer to both FIG. 2 and FIG. 3. During a period wherein the power switch PS is ON, the current flowing through the primary winding W1 and the power switch PS increases; on the other hand, during a period wherein the power switch PS is OFF, the current flowing through the primary winding W1 and the power switch PS is zero. Hence, the voltage VRcs across the resistor Rcs has the waveform as shown. By the clamping effect of the diode D, any voltage lower than a forward conduction voltage Vf of the diode D is filtered out, so the clamp voltage Vclp has the waveform as shown. The current sense pin voltage received by the current sense pin CS corresponds to the waveform of the voltage VRcs during the period wherein the power switch PS is ON, and corresponds to the waveform of the clamp voltage Vclp minus the voltage across the temperature-sensitive resistor Rtc during the period wherein the power switch PS is OFF. When the temperature-sensitive resistor Rtc has a positive temperature coefficient, the current sense pin voltage decreases as the temperature increases, which is shown by the waveform Vcs1, and the current sense pin voltage increases as the temperature decreases, which is shown by the waveform Vcs2. Hence, according to the present invention, a reference voltage Vref can be set so that the OTP function can be triggered when the temperature is too high. Likely, when the temperature-sensitive resistor Rtc has a negative temperature coefficient, the current sense pin voltage increases as the temperature increases, which is shown by the waveform Vcs2, and the current sense pin voltage increases as the temperature decreases, which is shown by the waveform. Vcs1. By the same token, a reference voltage Vref can be set so that the OTP function can be triggered when the temperature is too high.

However, during the period wherein the power switch PS is ON, the relationships between the current sense pin voltages Vcs1 and Vcs2 and the reference voltage Vref may be uncertain (depending on the current flowing through the primary winding W1 and the power switch PS, the resistance of the resistor Rcs, and the resistance of the resistor Rs, but these parameters may need to be set to meet other requirements which may not fit for the setting of the temperature-sensitive resistor Rtc); therefore, preferably, the current sense pin voltages Vcs1 and Vcs2 are compared with the reference voltage Vref during the period wherein the power switch PS is OFF, to determine whether to trigger the OTP function.

Figure 4:
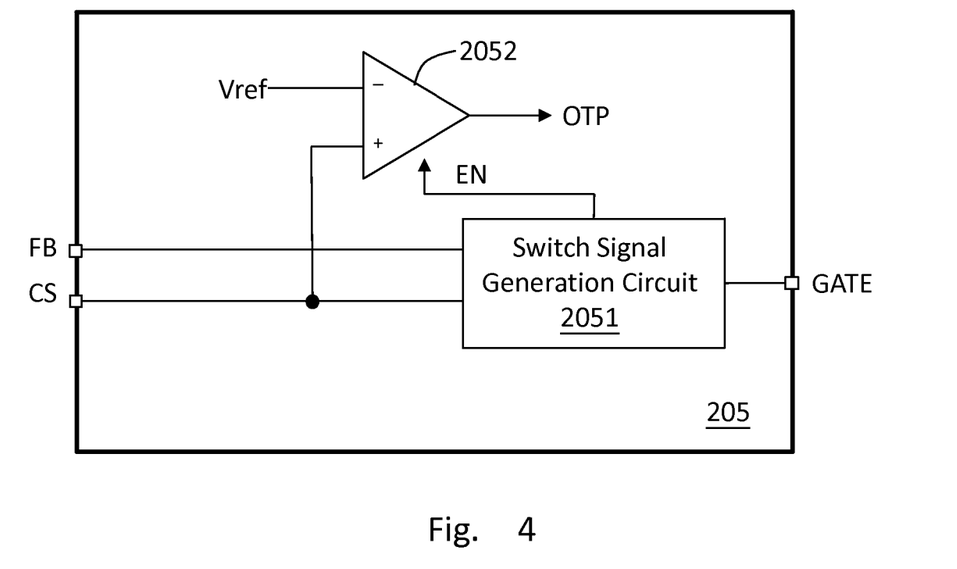
FIGS. 4-7 show several embodiments as to how the control circuit determines whether to trigger the OTP function.

FIG. 4 shows an embodiment as to how the control circuit 205 determines whether to trigger the OTP function. As shown in the figure, in this embodiment, the control circuit 205 includes, for example but not limited to: a switch signal generation circuit 2051 and a comparator 2052, wherein the comparator 2052 is enabled during a period wherein the power switch PS is OFF. The switch signal generation circuit 2051 receives the current sense signal and the voltage feedback signal related to the output voltage Vout, and the switch signal generation circuit 2051 generates the control signal which is outputted through the switch control pin GATE. The current sense signal is the waveform in the current sense pin voltage which corresponds to the voltage VRcs (that is, the waveform of the current sense pin voltage when the power switch PS is ON), and the voltage feedback signal can be obtained from the voltage feedback pin FB. The comparator 2052 compares the temperature-related signal and the reference voltage Vref to determine whether to trigger the OTP function. The temperature-related signal is the waveform in the current sense pin voltage which corresponds to the clamp voltage Vclp minus the voltage across the temperature-sensitive resistor Rtc (that is, the waveform of the current sense pin voltage when the power switch PS is OFF). When the temperature-sensitive resistor Rtc has a positive temperature coefficient, the OTP function can be triggered when the temperature-related signal is lower than the reference voltage Vref; when the temperature-sensitive resistor Rtc has a negative temperature coefficient, the OTP function can be triggered when the temperature-related signal is higher than the reference voltage Vref.

Figure 5:
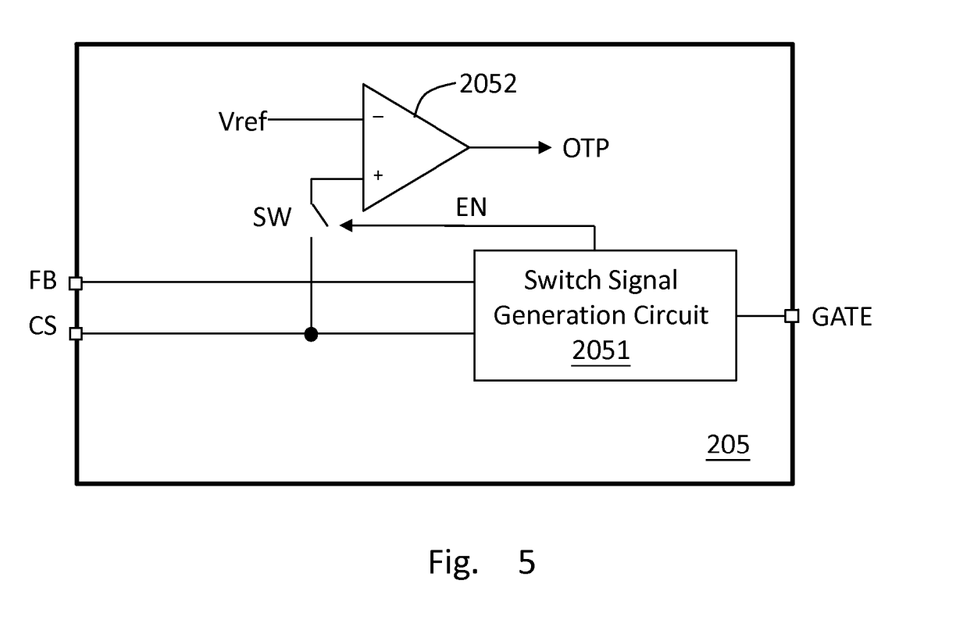

That the comparator 2052 is enabled during the period wherein the power switch PS is OFF can be embodied in any equivalent ways. For example, as shown in the embodiment of FIG. 5, an enable switch SW can be provided at a path through which the comparator 2052 receives the temperature-related signal. The switch signal generation circuit 2051 turns ON enable switch SW after it has the turned OFF the power switch PS. Certainly, this is only one possible embodiment and there are many equivalent ways to realize the same function. Any method capable of enabling the comparator 2052 during the period wherein the power switch PS is OFF is regarded as an equivalent to FIG. 5 and should fall within the scope of the present invention.

Figure 6:
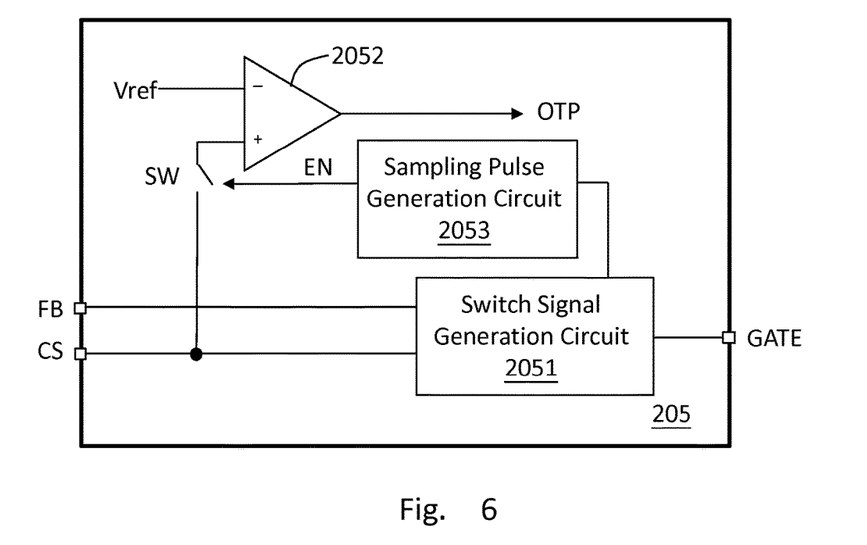

FIG. 6 shows another embodiment as to how the control circuit 205 determines whether to trigger the OTP function. As shown in the figure, in this embodiment, the control circuit 205 further includes a sampling pulse generation circuit 2053, for generating a sampling pulse to turn ON the enable switch SW at a proper timing. Referring to FIG. 3, assuming that the secondary winding W2 is fully discharged at the time point t2, and that the next cycle starts at the time point t3 (that is, the flyback power converter 200 operates in DCM wherein the next cycle does not start before or immediately when the secondary winding W2 is fully discharged), a ringing waveform will appear in the auxiliary winding voltage Vaux, and it is preferred not to determine whether to trigger the OTP function by the comparison between the temperature-related signal and the reference voltage Vref within this ringing period. Hence, the sampling pulse generation circuit 2053 can be thus arranged so that it generates a sampling pulse to turn ON the enable switch SW before the time point t2 so that the comparison is performed before the time point t2. Note that the sampling pulse generation circuit 2053 is preferred but not necessary. For example, if the flyback power converter 200 is controlled to operate in the CCM (the next cycle starts before or immediately when the secondary winding W2 is fully discharged), there will be no ringing waveform appearing in the auxiliary winding voltage Vaux, or it can regarded as that the time point t3 is equal to the time point t2. In this case, the comparator 2052 can be enabled at any time after the power switch PS is turned OFF and before the time point t3, and the sampling pulse generation circuit 2053 is not required.

Figure 7:
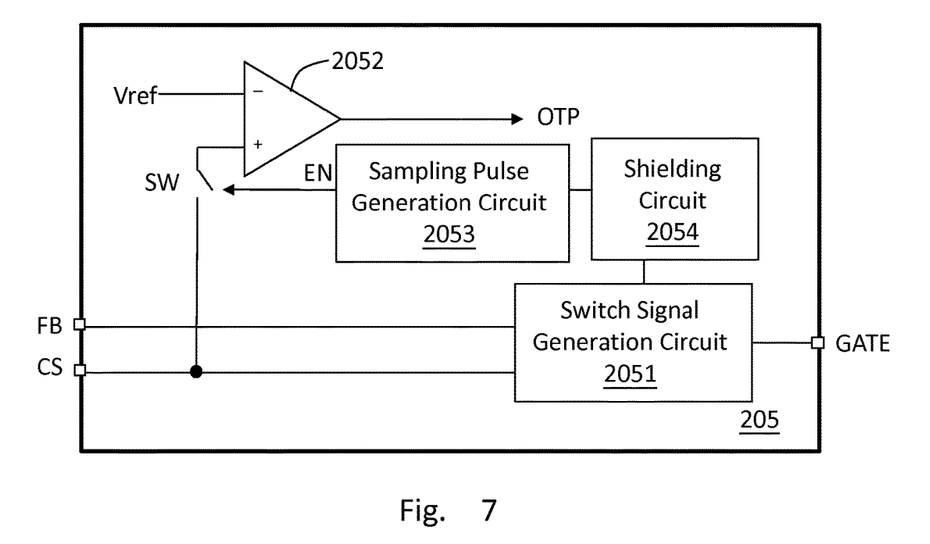

FIG. 7 shows another embodiment as to how the control circuit 205 determines whether to trigger the OTP function. As shown in the figure, in this embodiment, the control circuit 205 further includes a shielding circuit 2054 in additional to the sampling pulse generation circuit 2053. The function of the shielding circuit 2054 is to shield the sampling pulse generated by the sampling pulse generation circuit 2053 so that the sampling pulse turns ON the enable switch SW not only before the time point t2 but also after the time point t1, that is, to control the comparator 2052 so that it performs the comparison between the time points t1 and t2. The shielding circuit 2054 can be, for example but not limited to, a delay circuit which delays the sampling pulse generation circuit 2053 to generate the sampling pulse for a predetermined time after the time point t1. Note that the shielding circuit 2054 is preferred but not necessary. For example, when an over-temperature condition occurs, although the comparator 2052 performs an incorrect comparison between the time points t0 and t1 which does not trigger the OTP function, it is fine as long as the OTP function is correctly triggered between the time points t1 and t2.

Figure 8:
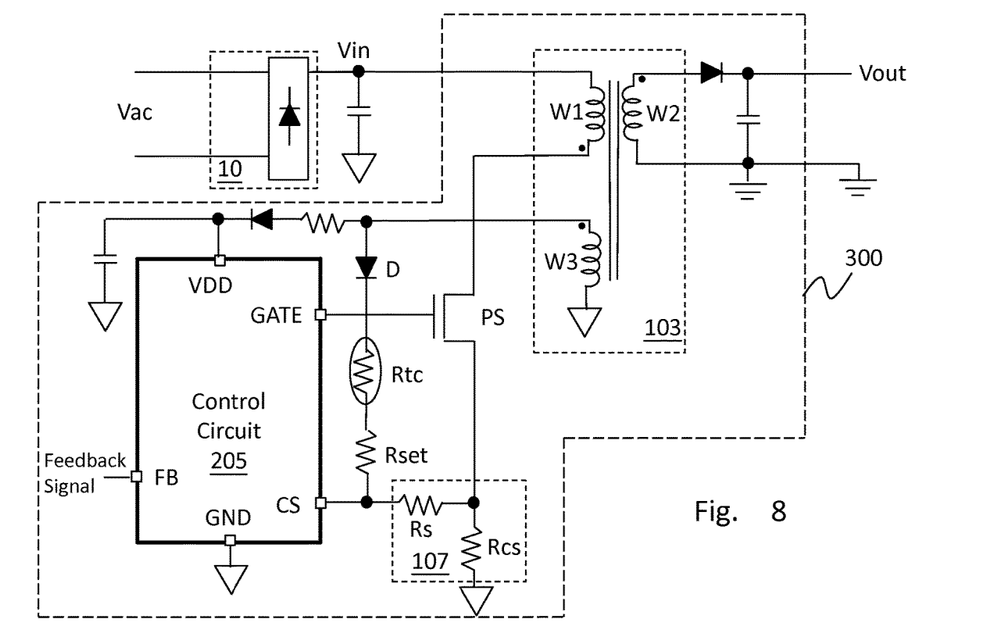
FIGS. 8-10 respectively show flyback power converters according to second to fourth embodiments of the present invention.

FIG. 8 shows a flyback power converter according to a second embodiment of the present invention. In this embodiment, the flyback power converter 300 further includes an adjustment resistor Rset, coupled between the temperature-sensitive resistor Rtc and the current sense pin CS. The specification as to what condition triggers the OTP function may differ according to different applications; the specification of the output voltage Vout may differ according to different applications; and the voltage generated by the auxiliary winding W3 may differ according to different applications. All these differences can affect the setting of the reference voltage Vref (the threshold to be compared with the temperature-related signal), but the temperature-sensitive resistor Rtc may not be able to provide a voltage difference at a proper range to match with the applications. The adjustment resistor Rset can adjust the total voltage across the temperature-sensitive resistor Rtc and the adjustment resistor Rset to better fall in the desired range so that the comparison between the temperature-related signal and the reference voltage Vref can be properly performed.

Figure 9:
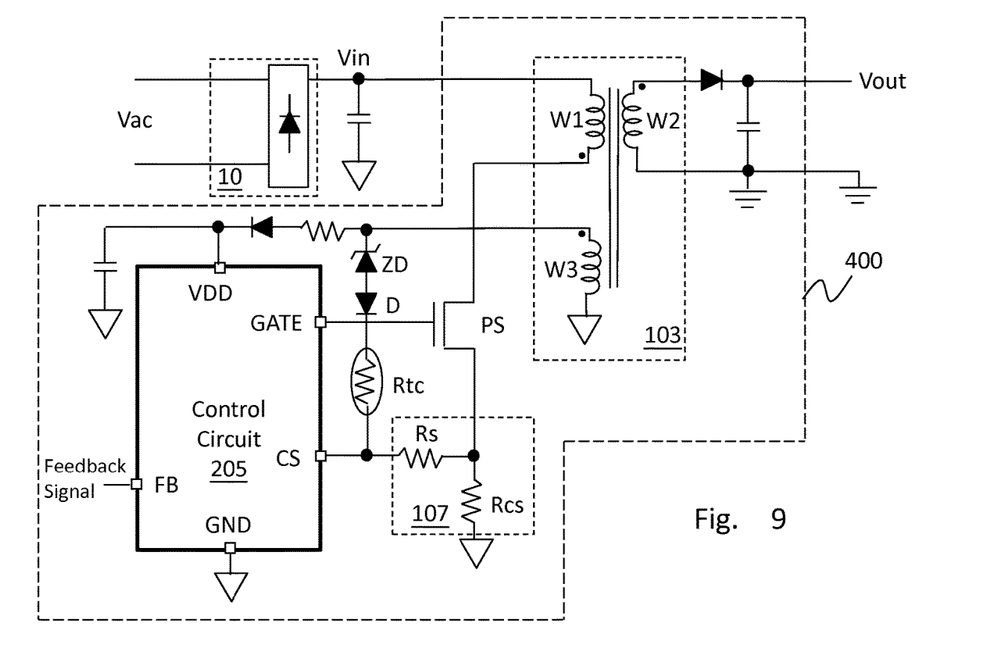

FIG. 9 shows a flyback power converter according to a third embodiment of the present invention. In this embodiment, the flyback power converter 400 further includes a Zener diode ZD having a cathode coupled to the auxiliary winding W3 and anode coupled to the anode of the diode D. The function of the Zener diode ZD is to provide a fixed voltage drop between the auxiliary winding W3 and the anode of the diode D, to reduce the voltage that the current sense pin CS needs to withstand.

Figure 10:
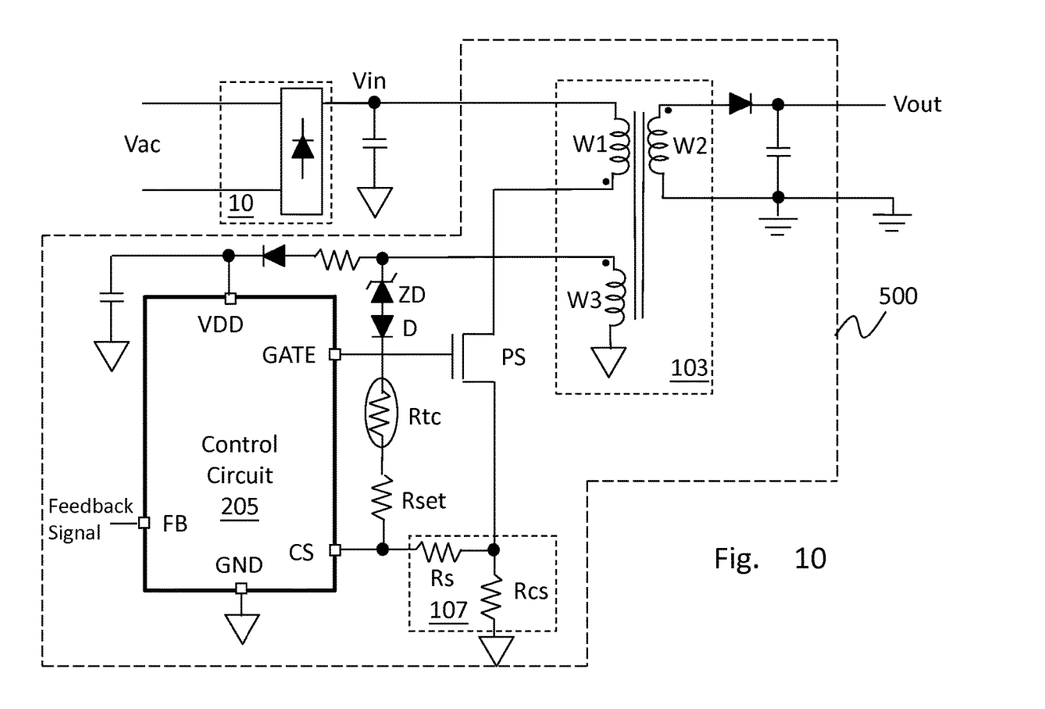

FIG. 10 shows a flyback power converter according to a fourth embodiment of the present invention. This embodiments shows that the flyback power converter 500 can include both the Zener diode ZD and the adjustment resistor Rset.

Figure 11:
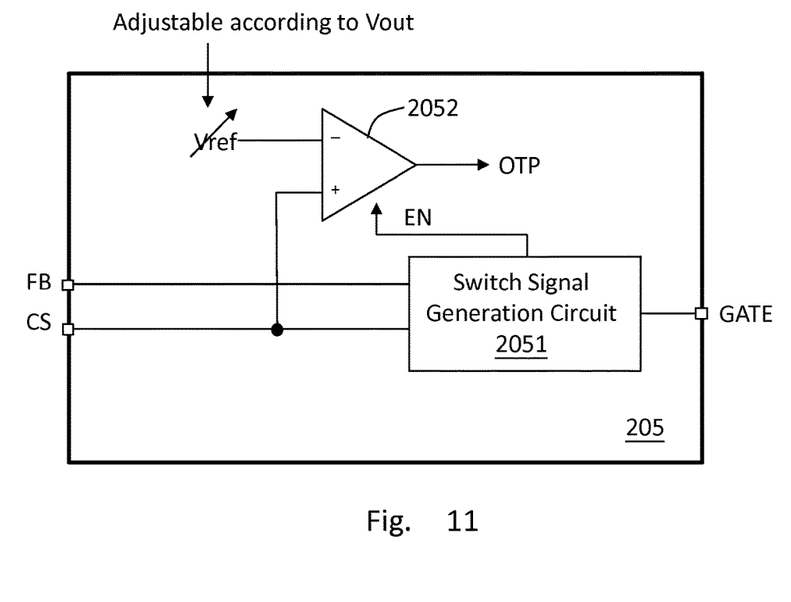
FIG. 11 shows another embodiment as to how the control circuit determines whether to trigger the OTP function.

FIG. 11 shows another embodiment as to how the control circuit 205 determines whether to trigger the OTP function. In certain applications, the target of the output voltage Vout is adjustable. However, because the turn ratio between the secondary winding W2 and the auxiliary winding W3 is fixed, when the output voltage Vout changes, the auxiliary winding voltage Vaux changes accordingly, and this will change the temperature-related signal in the current sense pin voltage. Hence, the original setting of the reference voltage Vref may not properly trigger the OTP function. To solve this problem, as shown in the figure, in this embodiment, the reference voltage Vref in the control circuit 205 is adjustable, which has a variable voltage level correlated to the output voltage. Because the auxiliary winding voltage Vaux changes when the output voltage Vout changes, if the reference voltage Vref also changes correspondingly, the temperature-related signal can be compared with a correct reference voltage Vref to trigger the OTP function correctly.

Figure 12:
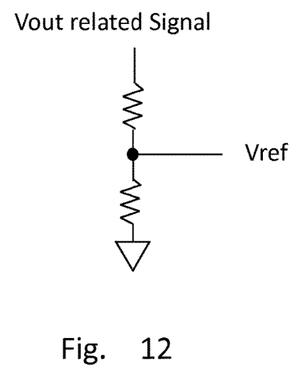
FIGS. 12-13 show two embodiments as to how the reference voltage is adjusted according to the output voltage.
Figure 13:
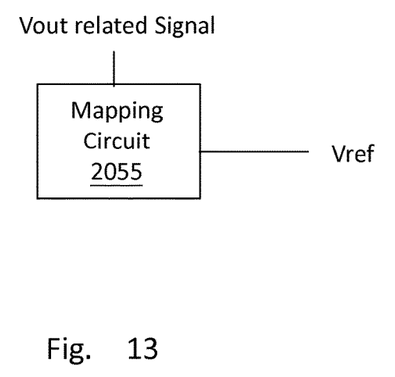

For example, FIGS. 12-13 show two embodiments as to how the reference voltage Vref is adjusted according to the output voltage Vout. In the embodiment of FIG. 12, the reference voltage Vref is a divided voltage of the output voltage Vout; in the embodiment of FIG. 13, a mapping circuit 2055 maps an output-voltage-related signal to a corresponding reference voltage Vref. The "output-voltagerelated signal" for example can be obtained from the auxiliary winding voltage Vaux or from the voltage feedback signal which is related to the output voltage Vout.

Figure 14:
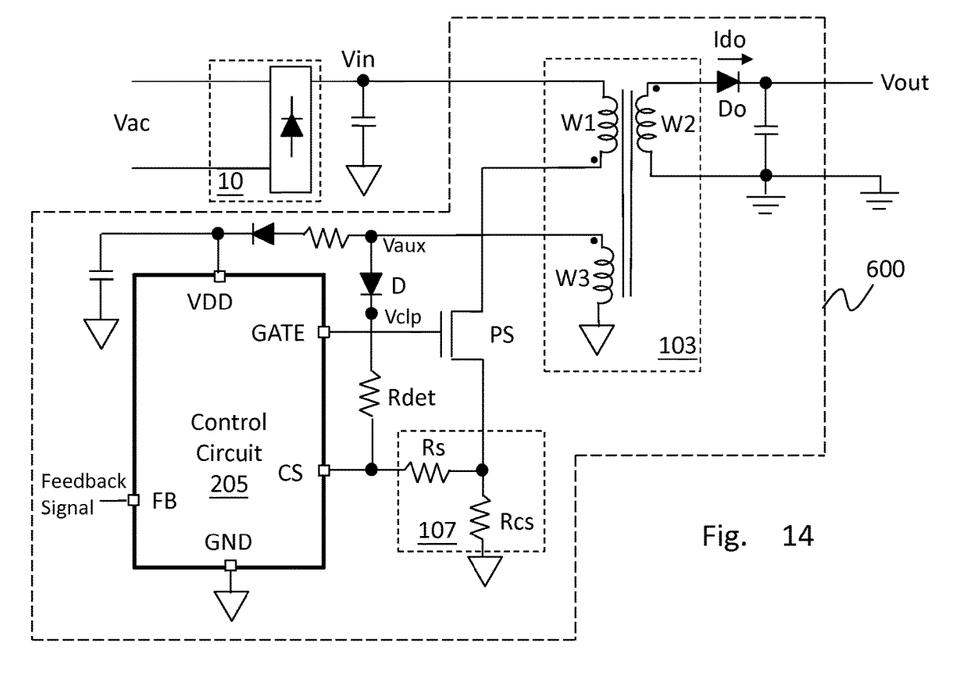
FIG. 14 shows a flyback power converter according to a fifth embodiment of the present invention.

Please refer to FIG. 14 for a flyback power converter according to a fifth embodiment of the present invention. As shown in FIG. 14, a rectifier circuit 10 rectifies an AC voltage Vac to generate an input voltage Vin. The rectifier circuit 10 is for example a bridge rectifier circuit. In the flyback power converter 600, a primary winding W1 of a transformer 103 receives the input voltage Vin. A power switch PS controls the conduction time of the primary winding W1 to generate an output voltage Vout at the secondary winding W2. The power switch PS is controlled by a control circuit 605; the control circuit 605 is an IC which has a predetermined number of pins. The control circuit 605 obtains a current sense signal through a current sense pin CS from a current sense circuit 107. The current sense signal is related to a current flowing through the power switch PS, which is the current flowing through the primary winding W1. The control circuit 605 obtains a voltage feedback signal related to the output voltage Vout through a voltage feedback pin FB. The voltage feedback signal can be generated from a voltage divider circuit (not shown) connected to an auxiliary winding W3 or from an opto-coupler (not shown) connected to the secondary side of the transformer 103. The current sense circuit 107 includes, for example but not limited to a resistor Rcs coupled between the power switch PS and ground, and a resistor Rs coupled between the power switch PS and the current sense pin CS. The resistor Rs is preferred but not necessary, and it can be omitted. The control circuit 605 generates a control signal which is outputted from the switch control pin GATE to control the operation of the power switch PS.

In this embodiment, the flyback power converter 600 further includes a mode detection resistor Rdet coupled between the auxiliary winding W3 and the current sense pin CS, for providing a mode detection signal to the control circuit 605. In addition, preferred but not necessary, a diode D can be coupled between the mode detection resistor Rdet and the auxiliary winding W3, wherein the anode of the diode D is coupled to the auxiliary winding W3 and the cathode of the diode D is coupled to the mode detection resistor Rdet. The diode D provides a voltage clamping function, but it can be omitted. The flyback power converter 600 according to this embodiment can detect whether the operation mode is the CCM or the DCM without requiring an additional pin.

Figure 15:
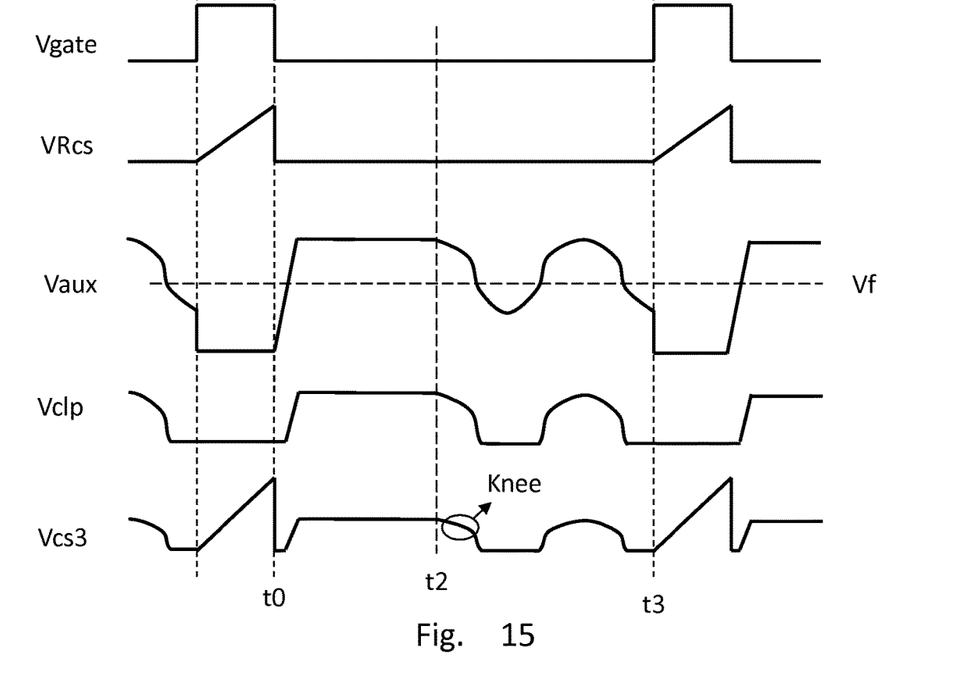
FIGS. 15-16 show waveforms of the control signal Vgate, the voltage VRcs across the resistor Rcs, the auxiliary winding voltage Vaux, the clamp voltage Vclp which is obtained by clamping the auxiliary winding voltage Vaux by a diode D, and the current sense pin voltages Vcs3 and Vcs4 under different conditions.
Figure 16:
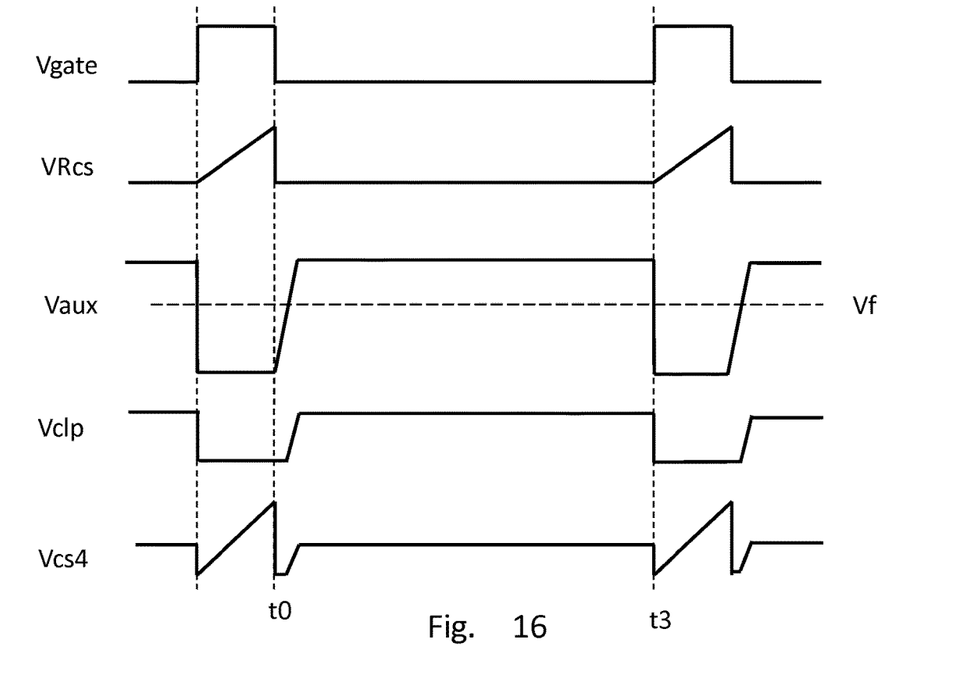

Please refer to FIGS. 15-16, which show waveforms of the control signal Vgate, the voltage VRcs across the resistor Rcs, the auxiliary winding voltage Vaux, the clamp voltage Vclp which is obtained by clamping the auxiliary winding voltage Vaux by a diode D, and the current sense pin voltages Vcs3 and Vcs4 under different conditions. As described in the above, if the flyback power converter 600 operates in the DCM, a ringing waveform will appear in the auxiliary winding voltage Vaux (as shown between the time points t2-t3 in FIG. 15), whereas if the flyback power converter 600 operates in the CCM, no ringing waveform will appear in the auxiliary winding voltage Vaux (as shown between the time points t0-t3 in FIG. 16). When the flyback power converter 600 operates in the DCM, it also means that after the secondary winding W2 is fully discharged, a current flowing through an output diode Do at the secondary side of the flyback power converter 600 is zero and there is no forward conduction voltage across the output diode Do, so the output voltage Vout is equal to the voltage at the upper node of the secondary winding W2. This is an important time window for certain detections and calculations.

Figure 17:
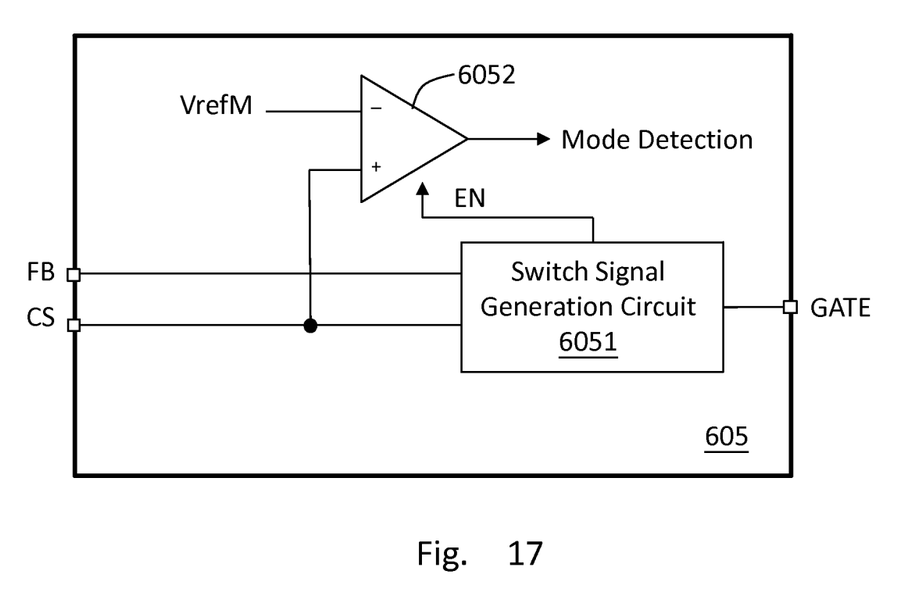
FIGS. 17-18 show two embodiments as to how the control circuit performs a mode determination.

Hence, referring to FIG. 17, in one embodiment, the current sense pin voltage can be compared with a properly set reference voltage VrefM during a period wherein the power switch is OFF, to determine whether a ringing waveform appears in the auxiliary winding voltage Vaux (such as but not limited to detecting a knee point in FIG. 15). If a ringing waveform appears in the auxiliary winding voltage Vaux, it can be determined that the flyback power converter 600 operates in the DCM. As shown in the figure, in this embodiment, the control circuit 605 includes, for example but not limited to: a switch signal generation circuit 6051 and a comparator 6052, wherein the comparator 6052 is enabled during a period wherein the power switch PS is OFF. The switch signal generation circuit 6051 receives the current sense signal and the voltage feedback signal related to the output voltage Vout, and the switch signal generation circuit 6051 generates the control signal which is outputted through the switch control pin GATE. The current sense signal is the waveform in the current sense pin voltage which corresponds to the voltage VRcs (that is, the waveform of the current sense pin voltage when the power switch PS is ON), and the voltage feedback signal can be obtained from the voltage feedback pin FB. The comparator 6052 compares the mode detection signal in the current sense pin voltage and the reference voltage VrefM to determine whether the flyback power converter 600 operates in the CCM or the DCM. In this embodiment, the mode detection signal corresponds to the knee point in the current sense pin voltage (or, corresponds to the information whether the knee point exists in the current sense pin voltage).

That the comparator 6052 is enabled during the period wherein the power switch PS is OFF can be embodied in any equivalent ways. For example, similar to the embodiment of FIG. 5, an enable switch SW can be provided at a path through which the comparator 6052 receives the temperature-related signal. The switch signal generation circuit 6051 turns ON enable switch SW after it has the turned OFF the power switch PS. Certainly, this is only one possible embodiment and there are many equivalent ways to realize the same function. Any method capable of enabling the comparator 6052 during the period wherein the power switch PS is OFF is regarded as an equivalent and should fall within the scope of the present invention.

Figure 18:
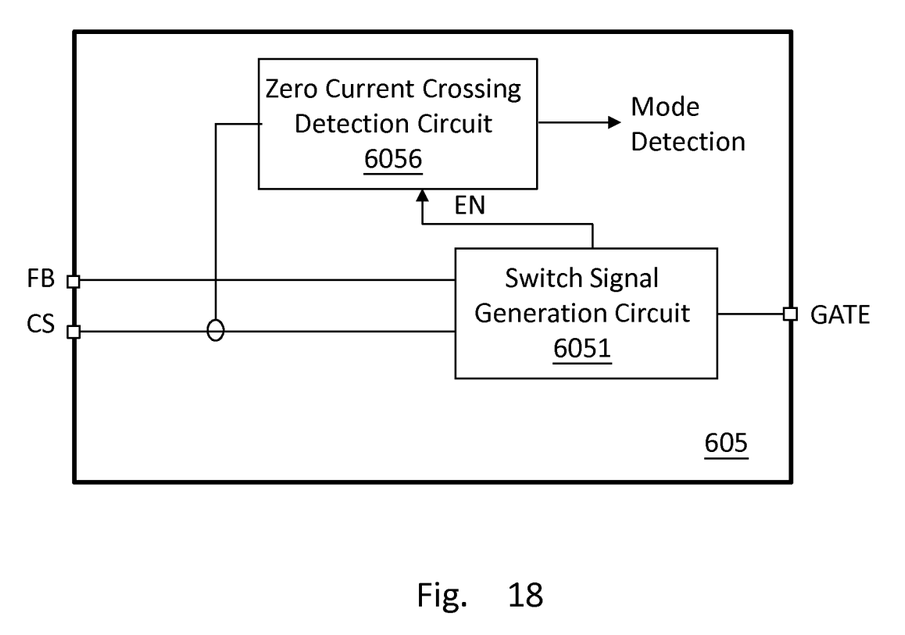

The above embodiment determines whether the flyback power converter 600 operates in the CCM or the DCM according to voltage detection; in another embodiment, this can be done by current detection. As described in the above, if the flyback power converter 600 operates in the DCM, the secondary winding W2 is fully discharged, and correspondingly, the auxiliary winding W3 is fully discharged. Hence, referring to FIG. 18, a zero current crossing (ZCX) detection circuit 6056 can be provided in the control circuit 605 to detect whether a zero current condition occurs in the current flowing inward from the current sense pin CS during a period wherein the power switch is OFF. If such a zero current condition occurs, it can be determined that the flyback power converter 600 operates in the DCM. In this embodiment, the mode detection signal corresponds to the zero current crossing event (or, corresponds to the information whether the zero current crossing event occurs).

Figure 19:
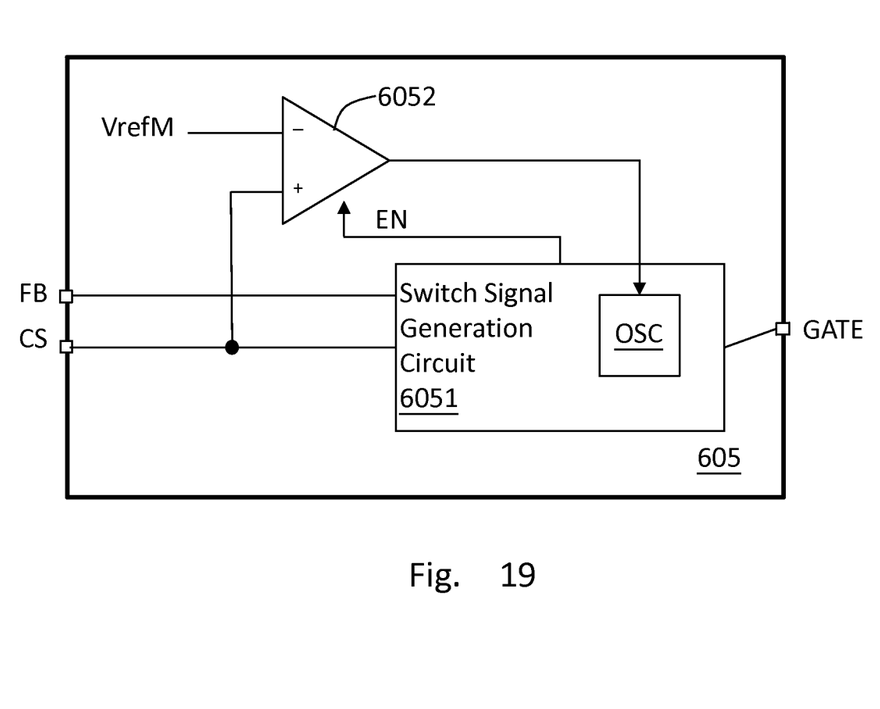
FIG. 19 shows an application as to how the mode determination information can be used.

The information that the flyback power converter 600 operates in the CCM or the DCM can be used in many ways. For example, as described in the above, this information can be used to determine whether there is a forward conduction voltage across the output diode; if there is no such forward conduction voltage, then the output voltage Vout is equal to the voltage at the upper node of the secondary winding W2. For another example, when the knee point is detected, this is the time point when the secondary winding W2 is just fully discharged, so if the next cycle starts immediately, the flyback power converter 600 can operate in the DCM but closest to the CCM (which can be regarded as a boundary conduction condition between the CCM and the DCM), and this is the operation mode which has the lowest switching loss. Therefore, as shown in FIG. 19 for example, when the knee point is detected, a signal related to this information can be transmitted to an oscillator OSC generating clock signals in the control circuit 605, so that the flyback power converter 600 starts the next cycle immediately, to operate in the boundary conduction condition. For a further example, referring to FIG. 20, the output diode Do has a current waveform Ido, wherein Ipeak is the current peak and Tdis is the discharging period of the secondary winding W2. The detection of the knee point helps to determine the discharging period Tdis, and the current Ido flowing through the output diode is $$Ido=(\frac{1}{2})Ipeak\times(Tdis/Tp)$$

Figure 20:
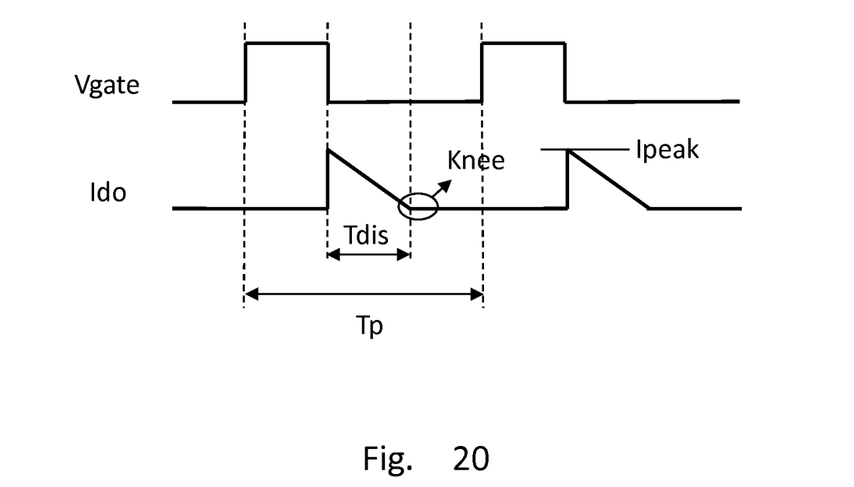
FIG. 20 shows waveforms of the control signal Vgate and the output diode current Ido.

With this information, a constant output current control can be achieved.

Figure 21:
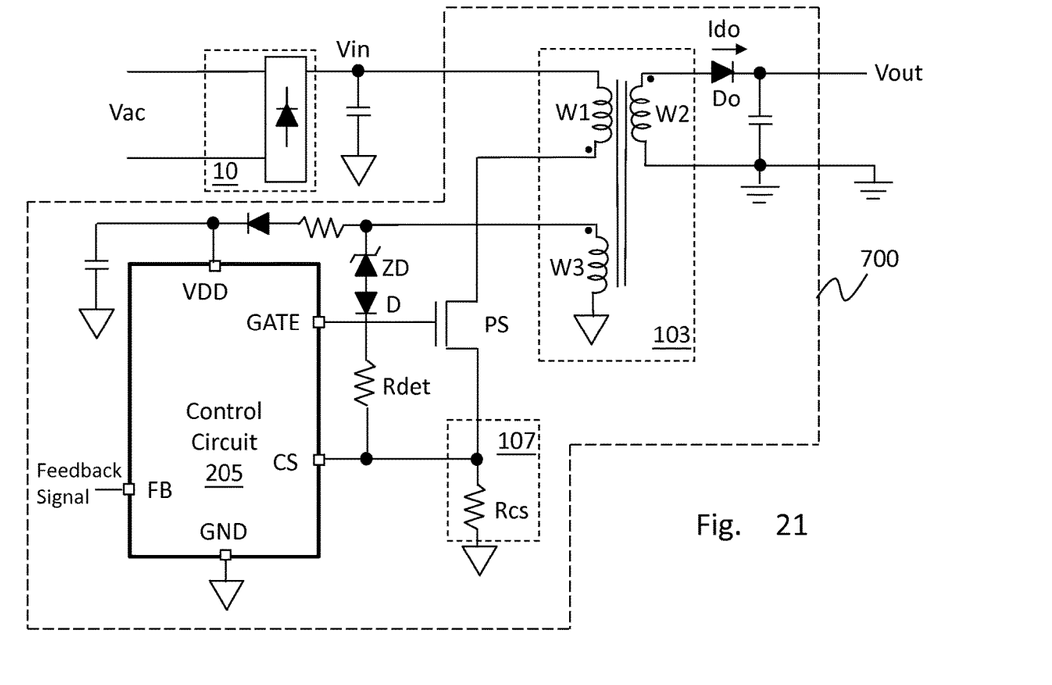
FIG. 21 shows a flyback power converter according to a sixth embodiment of the present invention.

FIG. 21 shows a flyback power converter according to a sixth embodiment of the present invention. In this embodiment, the flyback power converter 700 further includes a Zener diode ZD having a cathode coupled to the auxiliary winding W3 and anode coupled to the anode of the diode D. The function of the Zener diode ZD is to provide a fixed voltage drop between the auxiliary winding W3 and the anode of the diode D, to reduce the voltage that the current sense pin CS needs to withstand. This embodiment also shows that the resistor Rs in the current sense circuit 107 in the previous embodiments is not necessarily required.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, a device or circuit which does not substantially influence the primary function of a signal can be inserted between any two devices or circuits in the shown embodiments, so the term "couple" should include direct and indirect connections. For another example, the resistors or the voltage divider circuit is not limited to a circuit formed by passive devices, but it may be formed by other circuits, such as transistors. In view of the foregoing, the spirit of the present invention should cover all such and other modifications and variations, which should be interpreted to fall within the scope of the following claims and their equivalents.

What is claimed is:

1. A flyback power converter, comprising:
a transformer having a primary winding configured to operably receive an input voltage, a secondary winding configured to operably generate an output voltage, and an auxiliary winding;
a power switch coupled to the primary winding, configured to operably control an conduction time of the primary winding;
a control circuit, configured to operably generate a control signal to control the power switch, the control circuit being an integrated circuit which has a current sense pin configured to operably receive a current sense signal related to a current flowing through the power switch; and
a temperature-sensitive resistor coupled between the auxiliary winding and the current sense pin, configured to operably provide a temperature-related signal to the control circuit, such that the control circuit determines whether to trigger an over-temperature protection (OTP) function according to the temperature-related signal, wherein the control circuit obtains the temperature-related signal through the current sense pin.

2. The flyback power converter of claim 1, wherein the control circuit generates the control signal according to the current sense signal and a voltage feedback signal related to the output voltage, and the control circuit determines whether to trigger the OTP function during a period wherein the power switch is OFF.

3. The flyback power converter of claim 2, wherein the control circuit includes:
a switch signal generation circuit, configured to operably receive the current sense signal and the voltage feedback signal and generate the control signal;
a comparator, configured to operably compare the temperature-related signal and a reference signal to generate a comparison result indicating whether to trigger the OTP function; and
an enable switch configured to operably enable the comparator during the period wherein the power switch is OFF.

4. The flyback power converter of claim 3, wherein the reference signal has a fixed voltage level or a variable voltage level which is correlated to the output voltage.

5. The flyback power converter of claim 3, wherein the control circuit further includes a sampling pulse generation circuit configured to operably generate a sampling pulse during the period wherein the power switch is OFF, the sampling pulse controlling the enable switch to enable the comparator.

6. The flyback power converter of claim 3, wherein the control circuit further includes a shielding circuit configured to operably disable the comparator during an initial period in the period wherein the power switch is OFF.

7. The flyback power converter of claim 1, further comprising a diode having an anode coupled to the auxiliary winding and a cathode coupled to the temperature-sensitive resistor.

8. The flyback power converter of claim 7, further comprising a Zener diode having a cathode coupled to the auxiliary winding and anode coupled to the anode of the diode.

9. The flyback power converter of claim 1, further comprising an adjustment resistor coupled between the temperature-sensitive resistor and the current sense pin.

10. A control circuit of a flyback power converter, the flyback power converter comprising a transformer having a primary winding configured to operably receive an input voltage, a secondary winding configured to operably generate an output voltage, and an auxiliary winding; a power switch coupled to the primary winding, configured to operably control an conduction time of the primary winding according to a control signal generated by the control circuit; and a temperature-sensitive resistor having one end coupled to the auxiliary winding, the control circuit comprising:
a current sense pin configured to operably receive a current sense signal related to a current flowing through the power switch, and being coupled to another end of the temperature-sensitive resistor to obtain a temperature-related signal through the current sense pin;

a switch signal generation circuit, configured to operably receive the current sense signal and a voltage feedback signal related to the output voltage and generate the control signal;

a comparator, configured to operably compare the temperature-related signal and a reference signal to generate a comparison result indicating whether to trigger an over-temperature protection (OTP) function; and an enable switch configured to operably enable the comparator during a period wherein the power switch is OFF.

11. The control circuit of claim 10, wherein the reference signal has a fixed voltage level or a variable voltage level which is correlated to the output voltage.

12. The control circuit of claim 10, further comprising a sampling pulse generation circuit configured to operably generate a sampling pulse during the period wherein the power switch is OFF, the sampling pulse controlling the enable switch to enable the comparator.

13. The control circuit of claim 10, further comprising a shielding circuit configured to operably disable the comparator during an initial period in the period wherein the power switch is OFF.

14. A flyback power converter, comprising:
a transformer having a primary winding configured to operably receive an input voltage, a secondary winding configured to operably generate an output voltage, and an auxiliary winding;
a power switch coupled to the primary winding, configured to operably control an conduction time of the primary winding;
a control circuit, configured to operably generate a control signal to control the power switch, the control circuit being an integrated circuit which has a current sense pin configured to operably receive a current sense signal related to a current flowing through the power switch; and
a mode detection resistor coupled between the auxiliary winding and the current sense pin, configured to operably provide a mode detection signal to the control circuit whereby the control circuit performs a mode determination to determine whether the flyback power converter operates in a continuous conduction mode (CCM) or a discontinuous conduction mode (DCM);
wherein the control circuit includes:
a switch signal generation circuit, configured to operably receive the current sense signal and the voltage feedback signal and generate the control signal;
a comparator, configured to operably compare the mode detection signal and a reference signal to generate a comparison result for the mode determination; and
an enable switch configured to operably enable the comparator during the period wherein the power switch is OFF.

15. The flyback power converter of claim 14, wherein the control circuit generates the control signal according to the current sense signal and a voltage feedback signal related to the output voltage, and the control circuit determines whether the flyback power converter operates in the CCM or the DCM during a period wherein the power switch is OFF.

16. The flyback power converter of claim 14, wherein the secondary winding is coupled to an output diode, and a result of the mode determination is used to determine whether there is a forward conduction voltage across the output diode, is used to control the flyback power converter to operate in a boundary conduction condition between the CCM and the DCM, or is used to perform a constant current control of a current flowing through the output diode.

17. A flyback power converter, comprising:
a transformer having a primary winding configured to operably receive an input voltage, a secondary winding configured to operably generate an output voltage, and an auxiliary winding;
a power switch coupled to the primary winding, configured to operably control an conduction time of the primary winding;
a control circuit, configured to operably generate a control signal to control the power switch, the control circuit being an integrated circuit which has a current sense pin configured to operably receive a current sense signal related to a current flowing through the power switch; and
a mode detection resistor coupled between the auxiliary winding and the current sense pin, configured to operably provide a mode detection signal to the control circuit whereby the control circuit performs a mode determination to determine whether the flyback power converter operates in a continuous conduction mode (CCM) or a discontinuous conduction mode (DCM);
wherein the control circuit includes:
a switch signal generation circuit, configured to operably receive the current sense signal and the voltage feedback signal and generate the control signal;
a zero-current crossing (ZCX) detection circuit, configured to operably detect whether a ZCX condition occurs according to the mode detection signal; and
an enable switch configured to operably enable the ZCX detection circuit during the period wherein the power switch is OFF.

18. The flyback power converter of claim 17, wherein the control circuit generates the control signal according to the current sense signal and a voltage feedback signal related to the output voltage, and the control circuit determines whether the flyback power converter operates in the CCM or the DCM during a period wherein the power switch is OFF.

19. The flyback power converter of claim 17, wherein the secondary winding is coupled to an output diode, and a result of the mode determination is used to determine whether there is a forward conduction voltage across the output diode, is used to control the flyback power converter to operate in a boundary conduction condition between the CCM and the DCM, or is used to perform a constant current control of a current flowing through the output diode.

20. A flyback power converter, comprising:
a transformer having a primary winding configured to operably receive an input voltage, a secondary winding configured to operably generate an output voltage, and an auxiliary winding;
a power switch coupled to the primary winding, configured to operably control an conduction time of the primary winding;
a control circuit, configured to operably generate a control signal to control the power switch, the control circuit being an integrated circuit which has a current sense pin configured to operably receive a current sense signal related to a current flowing through the power switch;
a mode detection resistor coupled between the auxiliary winding and the current sense pin, configured to operably provide a mode detection signal to the control circuit whereby the control circuit performs a mode determination to determine whether the flyback power converter operates in a continuous conduction mode (CCM) or a discontinuous conduction mode (DCM);

a diode having an anode coupled to the auxiliary winding and a cathode coupled to the mode detection resistor; and a Zener diode having a cathode coupled to the auxiliary winding and anode coupled to the anode of the diode.

21. A control circuit of a flyback power converter, the flyback power converter comprising a transformer having a primary winding configured to operably receive an input voltage, a secondary winding configured to operably generate an output voltage, and an auxiliary winding; a power switch coupled to the primary winding, configured to operably control an conduction time of the primary winding according to a control signal generated by the control circuit; and a mode detection resistor having one end coupled to the auxiliary winding, the control circuit comprising:

a current sense pin configured to operably receive a current sense signal related to a current flowing through the power switch, and couple to another end of the mode detection resistor to obtain a mode detection signal;

a switch signal generation circuit, configured to operably receive the current sense signal and a voltage feedback signal related to the output voltage and generate the control signal;

a comparator, configured to operably compare the mode detection signal and a reference signal to generate a comparison result indicating whether the flyback power converter operates in a continuous conduction mode (CCM) or a discontinuous conduction mode (DCM), or a zero-current crossing (ZCX) detection circuit, configured to operably detect whether a ZCX condition occurs according to the mode detection signal to generate a detection result indicating whether the flyback power converter operates in the CCM or the DCM; and an enable switch configured to operably enable the comparator or the ZCX detection circuit during a period wherein the power switch is OFF.

* * * * *